March 14, 1933. L. L. VAYDA 1,901,208
PROCESS AND APPARATUS FOR MEASURING TEMPERATURES OF MOVING BODIES
Filed Feb. 16, 1929
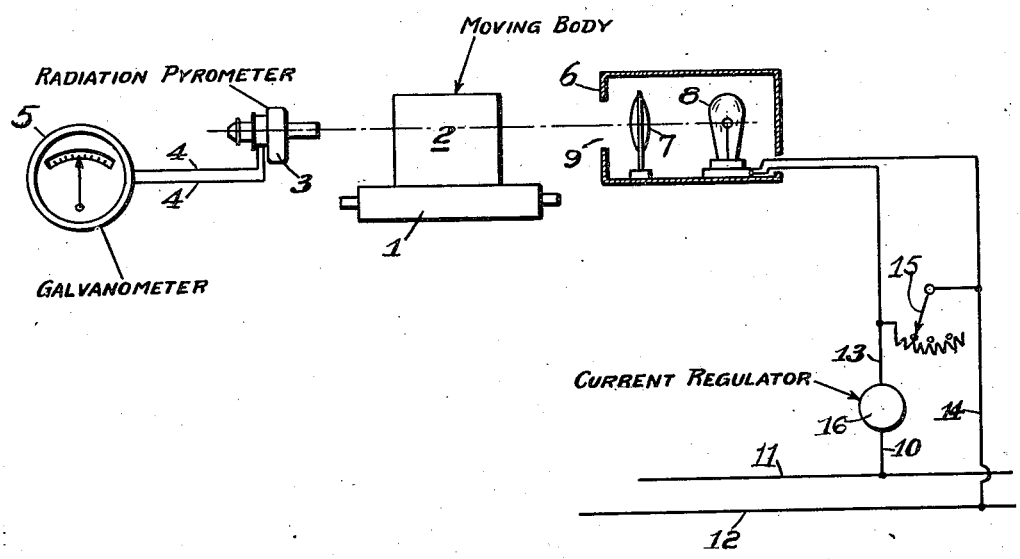
INVENTOR
Louis L. Vayda
by James C. Bradley
atty Patented Mar. 14, 1933

1,901,208

UNITED STATES PATENT OFFICE

LOUIS L. VAYDA, OF ASPINWALL, PENNSYLVANIA, ASSIGNOR TO BACHARACH INDUSTRIAL INSTRUMENT COMPANY, A CORPORATION OF PENNSYLVANIA

PROCESS AND APPARATUS FOR MEASURING TEMPERATURES OF MOVING BODIES

Application filed February 16, 1929. Serial No. 340,374.

The invention relates to a process and apparatus for measuring the temperatures of moving bodies or materials. It involves the use of the so-called radiation pyrometer, well-known in the art and employing a thermo couple or equivalent element and a galvanometer by means of which the temperature changes measured are indicated visually, and may be automatically recorded, if so desired. A radiation pyrometer, however, requires upward of five seconds of exposure to the heat waves from the body, whose temperature is to be measured, before the true temperature of the body is indicated, so that when the object is a rapidly moving one, it may pass beyond the range of the pyrometer before a correct indication of temperature is had. This delay or lag in registering is due to the heat inertia of the thermo couple and to the mass inertia and the frictional retardation of the galvanometer parts. The present invention is designed to counteract the effects causing the lag, so that when the pyrometer is exposed to the heat radiations from a series of separated bodies which move past it, a correct temperature determination is secured and the galvanometer needle held against any wide vibration back and forth incident to the spaces between the moving bodies. Briefly stated, this is accomplished by creating, at intervals corresponding to the spaces between the moving bodies, an electromotive force within the pyrometer, which approximates, in its effect on the pyrometer, the effect of the heat radiations of one of the bodies. This may be accomplished by a number of different devices, as later explained, but is preferably accomplished by providing a heating element in front of the pyrometer, arranged so that the heat rays therefrom are directed toward the pyrometer, but with the series of moving bodies, whose temperatures are to be measured interposed between the pyrometer and the element, so that such bodies successively cut off the heat rays from the element to the pyrometer, but permit such rays to strike the pyrometer through the spaces between the bodies. In operation, the heating element is regulated, so that the needle of the galvanometer remains substantially constant. The preferred form of apparatus for practicing the process is illustrated in the accompanying drawing, wherein:

The figure is a diagrammatic side elevation showing the apparatus in use.

Referring to the drawing, 1 indicates one roller of a conveyor adapted to carry a series of heated bodies 2, whose temperature is to be measured, past a radiation pyrometer, which may be of any approved construction wherein a couple is employed arranged to generate current in the circuit, 4, 4 leading to a galvanometer 5 when temperature changes are induced in the couple. Located on the side of the series of bodies 2 remote from the pyrometer is a heating element comprising a casing 6, in which is mounted a lens 7 and an incandescent electric lamp 8, arranged so that a beam consisting of parallel heat rays is directed through the opening 9 at the end of the casing on the line of heat reception 10 of the pyrometer.

The lamp is supplied with current from the lines 11 and 12 through the wires 13, 14 with a current adjuster in the form of a resistance and a switch 15 between the wires so as to regulate the heat supplied by the lamp 8. An automatic current regulator 16 is located in the line 13, so that when the current through the lamp is once adjusted by the switch 15, such current is afterwards automatically maintained constant.

To operate the device, the regulator 15 is adjusted so that the electro-motive force created by the lamp in the pyrometer (when the bodies 2 are not affecting it) is equivalent to the electro-motive force created by one of the heated bodies when such body is at a certain desired, or correct, temperature. If now, heated bodies are moved past the pyrometer, thus successively obscuring the heat effect of the lamp upon the pyrometer, and such bodies are at said desired or correct temperature, the electro-motive force will remain constant. If the hot bodies are not at such correct temperature, a change will take place in the electro-motive force produced in the pyrometer and will show on the galvanometer whether the hot bodies are colder or warmer than the correct temperature. The extent of difference will be relatively, but not exactly, indicated, and if the galvanometer is of the recording type, a graphic record of the temperature may thus be produced.

The process might be carried out by a number of different forms of apparatus other than the one shown. The drawing shows a lamp, heated electrically, as the source of artificially produced energy for affecting the pyrometer, but some other source of heat might be substituted, or the electro-motive force employed in heating the lamp to affect the pyrometer might be applied to such pyrometer in some other way, the actuation thereto being timed to correspond to the spaces between the heated bodies by the use of any suitable apparatus.

What I claim is:

1. A process for measuring the temperature of a heated body, which consists in first creating in a thermo-electric radiation pyrometer by means other than such body an electro-motive force approximately equal to that produced in the pyrometer when the body is moved through the field of reception of the pyrometer, then passing said body through such field, and at the same time cutting off the effect of such other means on the pyrometer as long as the heat from the body affects the pyrometer.

2. A process for measuring the temperature of a series of spaced heating bodies, which are moved in tandem transversely of the line of reception of a thermo-electric radiation pyrometer, which consists in creating in the pyrometer by means other than the heat from the bodies, and during the periods in which the spaces between the bodies are in registration with the pyrometer, an electro-motive force approximately equal to that produced in the pyrometer field by the heat from such bodies and preventing said means other than the bodies from acting on the pyrometer during the periods in which the bodies are in alignment with the pyrometer.

3. A process for measuring the temperature of a series of heated bodies, which consists in moving the bodies in a spaced tandem series across the line of reception of a thermo-electric radiation pyrometer and projecting along such line of reception through the spaces between the bodies, radiant heat substantially equal in effect upon the pyrometer couple to that produced by the heat radiated into the pyrometer from the bodies.

4. In combination in apparatus for measuring the temperature of a series of heated bodies carried along in tandem in spaced relation on a conveyor, a thermo-electric radiation pyrometer at one side of the path of movement of the bodies with its line of heat reception extending transversely of the line of movement thereof, a source of radiant heat in the field of the pyrometer on the other side of said line of movement so that the heat therefrom is directed into the pyrometer, and means for regulating said source of heat.

5. In combination in apparatus for measuring the temperature of a series of heated bodies carried along in tandem in spaced relation on a conveyor, a thermo-electric radiation pyrometer at one side of the path of movement of the bodies with its line of heat reception extending transversely of the line of movement thereof, a source of radiant heat in the field of the pyrometer on the other side of said line of movement so that the heat therefrom is directed into the pyrometer, said source of heat comprising an electric lamp and means for bringing its heat rays into substantial parallelism, and means for regulating the supply of current through the lamp.

6. A process of measuring the temperature of a heated body, which consists in first creating in a measuring instrument which is responsive to radiant energy, by means other than said body, an electro-motive force approximately equal to that produced in the instrument by radiation from the body, when the body is moved through the field of reception of the instrument, then passing said body through such field, and at the same time cutting off the effect of such other means on the instrument as long as the radiation from the body effects the instrument.

In testimony whereof, I have hereunto subscribed my name this 14th day of February, 1929.

LOUIS L. VAYDA.